(12) United States Patent
Haimi-Cohen (10) Patent No.: US 6,233,320 B1
(45) Date of Patent: May 15, 2001

(54) METHOD AND APPARATUS FOR RECORDING AND PLAYING BACK A CONVERSATION USING A DIGITAL WIRELESS PHONE

(75) Inventor: Raziel Haimi-Cohen, Springfield, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/337,777

(22) Filed: Jun. 22, 1998

(51) Int. Cl.[7] ................................................. H04M 11/10
(52) U.S. Cl. ....................... 379/88.27; 455/412; 455/413; 455/556; 379/88.16; 379/88.22; 379/88.28; 704/201; 704/270
(58) Field of Search ................................... 455/570, 412, 455/413, 229, 263, 569, 556, 557; 379/88.27, 88.28, 202–205, 88.16, 88.22; 704/201, 270

(56) References Cited

U.S. PATENT DOCUMENTS

| | | | |
|---|---|---|---|
| 5,524,138 | * 6/1996 | Dawano | 455/88.28 |
| 5,592,532 | * 1/1997 | Koizumi | 455/412 |
| 5,602,913 | * 2/1997 | Lee et al. | 455/570 |
| 5,790,957 | 8/1998 | Heidari | 455/412 |
| 5,825,853 | 10/1998 | Kojima et al. | 455/412 |
| 5,826,187 | 10/1998 | Core et al. | 455/412 |
| 5,889,838 | 3/1999 | Miura | 379/88.27 |
| 6,029,063 | 2/2000 | Parvulescu et al. | 455/412 |
| 6,038,536 | 3/2000 | Haroun et al. | 704/500 |

* cited by examiner

Primary Examiner—Lee Nguyen
Assistant Examiner—Simon Nguyen
(74) Attorney, Agent, or Firm—Law Offices of Peter H. Priest, PLLC (57) ABSTRACT

A wireless telephone with record and playback capability is disclosed. The telephone has an operation module, which transmits near-end signals and receives far-end signals, and a record module which writes transmission packets formed from the near-end signals in a first location of a memory and reception packets formed from the far-end signals in a second location of the memory. A playback module reads the transmission packets and the reception packets from the memory, and decodes the transmission packets into transmission speech samples and the reception packets into reception speech samples using transmission and reception decoders, respectively. Further, the playback module has a mixer to mix the transmission speech samples with the reception speech samples to form mixed speech signals for playback on a speaker. The playback module also includes a voice activity detector which outputs a skip signal to the transmission and reception decoders in response to detection of either voice in the transmission speech samples or silence in the reception speech samples. In response to the skip signal, the transmission and reception decoders discard a current transmission packet and a current receive packet and read a next transmission packet and a next reception packet from the memory.

19 Claims, 5 Drawing Sheets

| TRANSMIT SPEECH PACKET NO. 1 | RECEIVE SPEECH PACKET NO. 1 |
|---|---|
| TRANSMIT SPEECH PACKET NO. 2 | RECEIVE SPEECH PACKET NO. 2 |
| TRANSMIT SPEECH PACKET NO. 3 | RECEIVE SPEECH PACKET NO. 3 |
| ⋮ | ⋮ |
| LAST TRANSMIT SPEECH PACKET | LAST RECEIVE SPEECH PACKET |

METHOD AND APPARATUS FOR RECORDING AND PLAYING BACK A CONVERSATION USING A DIGITAL WIRELESS PHONE

BACKGROUND OF THE INVENTION

1. Field of the Invention

The present invention relates generally to improved methods and apparatus for recording and playing back speech, and more particularly, to the recording and playing back of two way telephonic conversations using a digital wireless phone.

2. Dissussion of the Prior Art

Many telephone answering devices (TADs, also known as "answering machines") provide a "two way conversation record" feature, which allows the user to record both near-end and far-end sides of a telephone conversation and later playback the recorded two way conversation. When the user of the TAD, also referred to as the near-end party, activates the conversation record feature of the TAD, then a telephone conversation between the user and a far-end party is recorded as follows. The far-end and the near-end audio speech signals are mixed (i.e. added together with appropriate gains), and the resulting mixed audio signal is recorded in the same way that a message is recorded on the TAD. In particular, if the TAD is digital, the mixed audio signal is fed into a mixed speech encoder for conversion to speech packets which are written or saved into a memory.

Play back of the recorded mixed conversation in the TAD is performed in exactly the same way as a playback of a recorded message. More particularly, if the TAD is digital, the stored speech packets are fed into a speech decoder which synthesizes and reconstructs the mixed audio signal for input to audio output circuits including a speaker.

Mobile wireless telephones are often used in situations where it is difficult for the user to write notes of important details of telephonic conversations. Therefore, the feature of two way conversation recording is even more useful for wireless phones than for stationary, wired phones or TADs.

Many wireless phones include a nonvolatile memory ("recording memory") and a processing unit similar to the ones found in a digital TAD. Thus, adding a conversation recording capability to wireless phones is easily achieved with minimal cost, while providing a great benefit to the user.

The method of conversation recording used in TADs is suitable for implementation in analog wireless phones. However, using this recording method in digital wireless phones suffers from various drawbacks, such as exceeding the capability of typical digital signal processors (DSPs) included in wireless digital phones. Thus, a more complex and costly DSP is required. Further, the quality of the played-back recorded speech is degraded due to tandeming, as will be described below.

Figure 1:
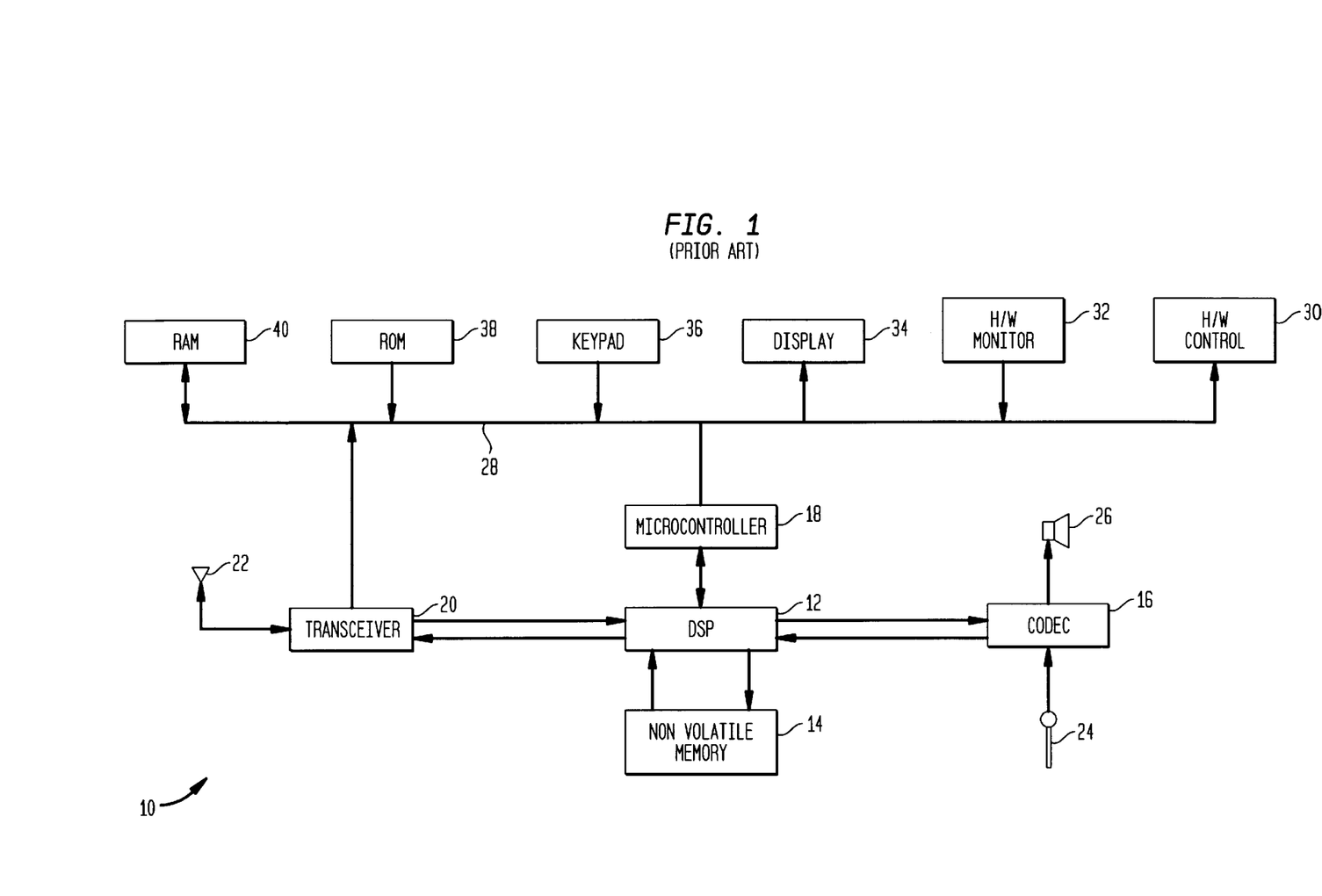
FIG. 1 shows a typical wireless digital telephone.

FIG. 1 shows a conventional wireless digital telephone 10 having a DSP 12 which performs numerous functions in a very short time to maintain an acceptable quality of telephonic conversations. During a conversation or call, the DSP functions include filtering, coding, decoding, error correction, tone generation, echo cancellation, muting and voice activity detection. These and other tasks increase the workload of the DSP, referred to as MIPS usage of the DSP, where MIPS is the acronym for million instructions per second.

The DSP 12 communicates with a nonvolatile memory 14 for storing information, a codec 16 for converting signals between digital and analog formats, a microcontroller 18 for managing operation of the phone such as detection of pressed keys, and a transceiver 20. The transceiver 20 is connected to an antenna 22 for the transmission and reception of signals. The codec 16 is also connected to a microphone 24 and a speaker 26.

The microcontroller 18 and transceiver 20 are connected to a system bus 28. Other elements of the phone 10 are connected to the system bus 28, such as a hardware control unit 30, a hardware monitor 32, a display 34, a keypad 36 and memory units which include a read only memory (ROM) 38 and a random access memory (RAM) 40.

Figure 2:
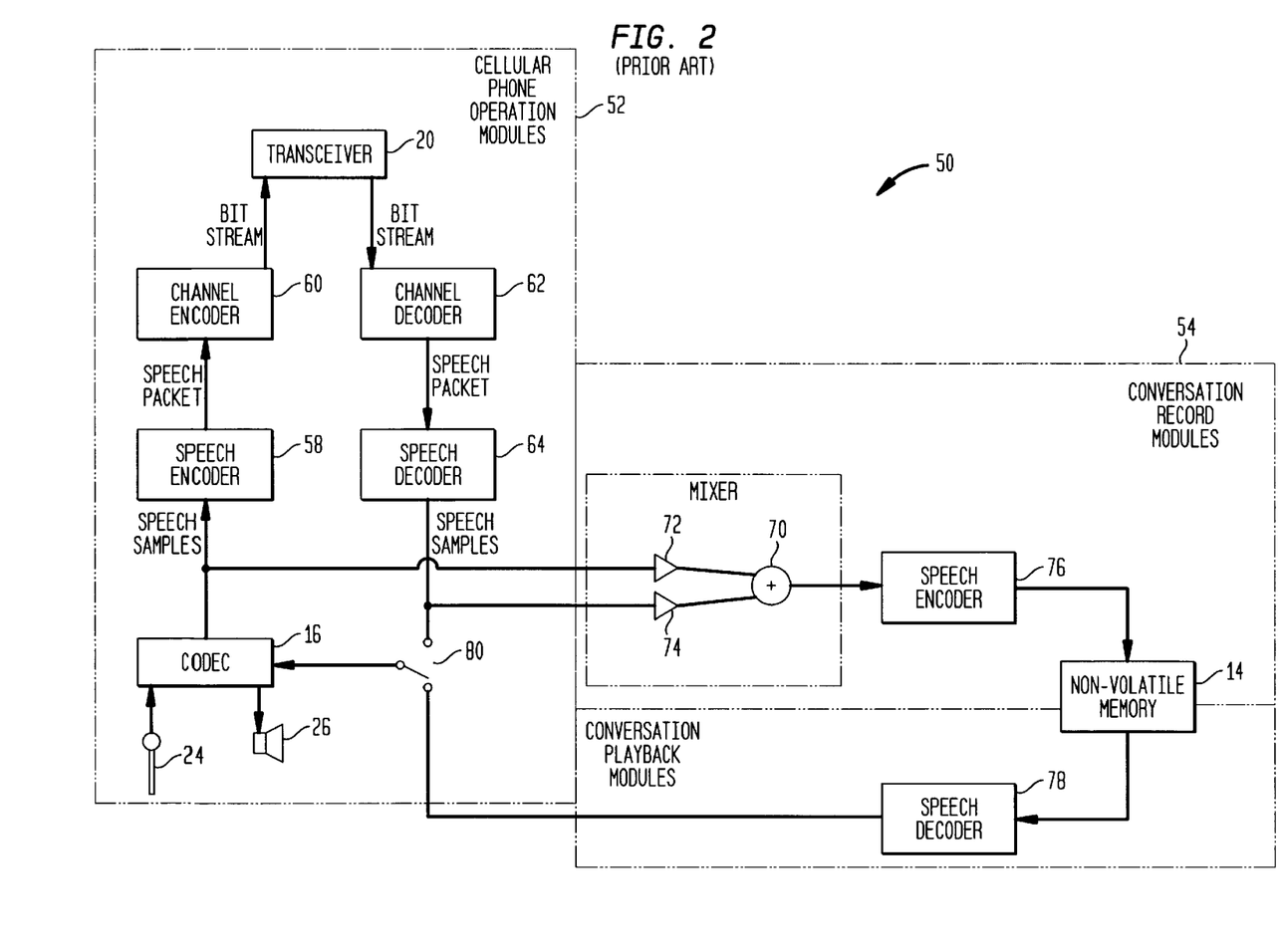
FIG. 2 shows a conventional wireless digital telephone with a record and playback feature.

FIG. 2 shows in greater detail modules used for recording and playback of telephonic conversations in a conventional digital wireless telephone 50. These modules include a cellular phone operation module 52, a conversation record module 54, and a conversation playback module 56.

The operation module 52 includes the codec 16 which is connected to the microphone 24 and to a speaker 26. Speech or audio signals from the near-end, i.e., the phone user, are provided from the microphone 24 to the codec 16, which digitizes the speech and provides digital transmission speech samples to a speech encoder 58. The speech encoder 58 encodes the digital transmission speech samples into a compressed form and provides digital transmission speech packets to a transmission channel encoder 60, which performs error correction encoding, and outputs a transmission bit stream to the transceiver 20 for modulation and transmission to the far-end.

Modulated radio frequency (RF) signals are received by the transceiver 20 from the far-end through the antenna 22 shown in FIG. 1. The received bit stream undergoes the reverse operations of the transmission bit stream. In particular, the received bit stream is decoded by a reception channel decoder 62 to provide reception digital speech packets to a reception speech decoder 64. The reception speech decoder 64 converts the reception digital speech packets to reception digital speech samples which are provided to the codec 16 for conversion to analog form and output to audio circuits and the speaker 26 for playback, as is typically performed in wireless communications.

Recording two way conversations between a far-end user and a near-end user, namely, the user of the conventional record and playback wireless telephone 50, is performed as follows. The transmission speech samples from the codec 16 and the reception speech samples from the reception speech decoder 64 are provided to the conversation record module 54 of the conventional record and playback phone 50.

Figure 3:
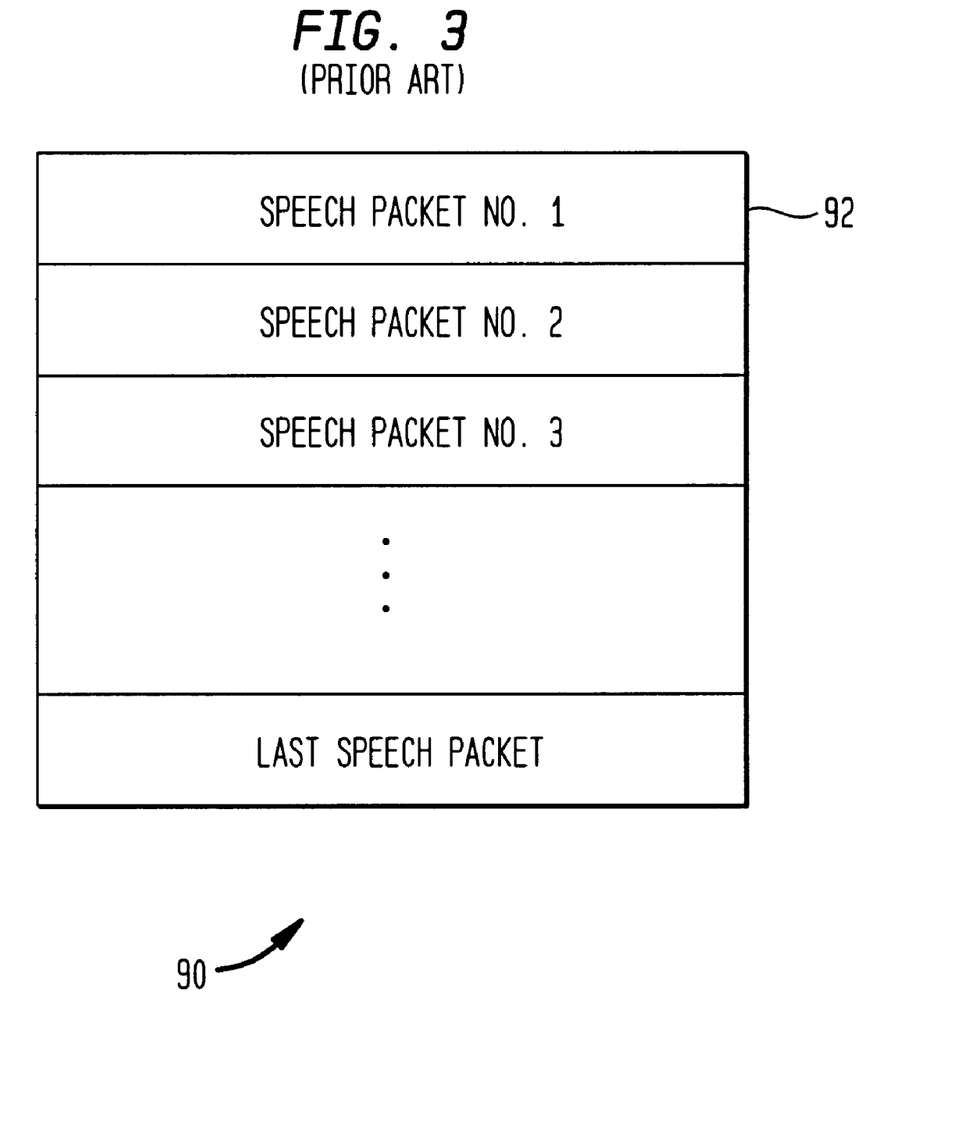
FIG. 3 illustrates mixed far-end and near-end speech packets stored in a memory of the conventional wireless digital telephone shown in FIG. 2.

In particular, transmission speech samples (i.e., near-end samples) and the reception speech samples (i.e., far-end samples) are provided to a mixer 70 through respective amplifiers 72, 74. The mixer 70 combines the near-end samples with the far-end samples and outputs mixed speech samples to a mixed speech encoder 76. The mixed speech encoder 76 encodes the mixed speech samples to form mixed speech packets, which are provided to the nonvolatile memory 14 for storage. FIG. 3 illustrates typical contents 90 of the nonvolatile memory 14, namely, the recorded mixed conversation, where each stored frame 92 is a mixed speech packet formed from the encoding of the mixture or combination of the far-end and near-end speech samples.

Returning to FIG. 2, the recorded conversations are stored as a mixture or combination of the far-end and near-end speech packets, in the nonvolatile memory 14. Playback of these conversations is provided by reading out the stored packets which are then provided to a mixed speech decoder 78 of the conversation playback module 56. The mixed speech decoder 78 decodes the mixed speech packets and outputs mixed speech samples. The mixed speech samples are provided to the speaker 26 through a switch 80 and the codec 16, which converts the mixed speech digital samples to analog audio signals.

The switch 80 selectively connects the mixed speech digital samples or the far-end reception speech samples from the speech decoder 64 to the codec 16, under the control of the DSP, for example, in response to an input from the user of the phone 50 to playback the recorded conversation. Similar to playback initiation, recording may be initiated in response to a user input, such as pressing a key on the keypad 36 (FIG. 1). Recording may be enabled in response to the user input using several approaches known in the art. For example, switches may be included at the inputs of the amplifiers 72 and 74 for controllably connecting and disconnecting these inputs to and from the operation module 52, or in other words, to and from the transmission speech encoder 58 and reception speech decoder 64, respectively.

Typically, the DSP 12 (FIG. 1) includes all the elements shown in FIG. 2, except for the transceiver 20, the nonvolatile memory 14, the microphone 24, the loudspeaker 26, and the codec 16. The conventional wireless digital phone 50 is equipped, by default, with the operation module 52 which performs speech encoding and decoding, which are also the engine of a digital TAD. Thus, providing record and playback features to a digital phone takes advantage of the pre-existing operation module 52 and only requires the addition of the record module 54 and the playback module 56, which share the nonvolatile memory 56.

The conventional wireless digital phone 50 requires an additional encoder, namely, the mixed speech encoder 76. To encode the mixed speech samples, an additional instance of encoding is performed. However, running a speech encoder consumes a large portion of the capacity of the DSP, typically accounting for about 40% of the real time load of the DSP which operates at near maximum capacity during a normal telephone conversation. In particular, during a normal telephone conversation, the DSP supports the running of the transmission speech encoders 58 and channel encoder 60, as well as the two reception decoders 62 and speech decoder 64 and various modem functions.

To additionally support the running of the mixed speed encoder 76, which will account for about 40% of the real time load on the DSP, is likely to exceed the real time capacity of the DSP used in conventional wireless telephones. Thus, to meet the computational requirements during conversation recording as outlined above, a more powerful DSP is required, which increases both the cost and power consumption of the system. Such increases are highly undesirable.

Another concern relates to the quality of the recorded conversation. In particular, the quality of the recording of the far-end reception speech, which is usually more important to the user than recording the near-end transmission speech, is degraded due to being encoded and decoded twice. In order to generate the mixed signal from the mixer 70 as outlined above, the far-end and near-end speech signals are added. However, the far-end signal which is available at the phone 50 has already been subjected to speech encoding at the far-end (via a speech encoder similar to the transmission speech encoder 58 in the near end phone 50 shown in FIG. 2) and to decoding at the phone by the reception speech decoder 64. Thus, when the mixed signal is encoded by the mixed speech encoder 76 for storage in the memory 14 on the phone 50, its far-end component is encoded for a second time; having encoded for the first time by the transmission encoder of the far-end phone for reception by the transceiver 20 of the near-end phone 50. This double encoding is called "tandeming" and is known to degrade the output speech quality upon playback.

Accordingly, there is a need for a wireless telephone that provides high quality record and playback capability of two way conversations without the need of a more powerful DSP, thus minimizing cost and power consumption. Such an approach also advantageously serves to increase the time between battery charging.

SUMMARY OF THE INVENTION

One object of the present invention is to provide a wireless radio apparatus with a record and playback capability for two way conversations and a method thereof which eliminates the problems of conventional wireless telephones.

Another object of the present invention is to provide a record and playback capability to a wireless radio apparatus with minimal increase in cost or power consumption.

A further object of the present invention is to provide a wireless radio apparatus with record and playback capability which has a high record and playback speech quality.

A still further object of the present invention is to provide a wireless radio apparatus with record and playback capability which allows individual volume control of near and far end speech and skipping the recording of near or far end speech.

A yet further object of the present invention is to provide a wireless radio apparatus with record and playback capability which allows skipping of playback of near or far end speech and playback of only the near or the far end speech, such as skipping the near end speech and playback of only the far end speech.

Various aspects of the present invention accomplish the above and other objects by providing a communication apparatus, such as a wireless radio or telephone or a base station, having an operation module which transmits near-end signals and receives far-end signals, and a record module which writes transmission packets formed from the near-end signals in a first location of a memory and reception packets formed from the far-end signals in a second location of the memory.

A playback module reads the transmission packets and the reception packets from the memory, converts the transmission packets to transmission speech samples and the reception packets to reception speech samples, and mixes the transmission speech samples with the reception speech samples to form mixed speech signals for playback on a speaker. The playback module includes a mixer which mixes the transmission speech samples with reception speech samples to form the mixed speech signals. Further, a first amplifier is provided to amplify the transmission speech samples, and a second amplifier is provided to amplify the reception speech samples prior to mixing thereof. One or both of the amplifiers may have a variable gain.

The playback module may suitably include a first decoder which decodes the transmission packets read from the memory to form the transmission speech samples. A second decoder decodes the reception packets read from the memory to form the reception speech samples.

In another embodiment, the playback module includes a voice activity detector which outputs a skip signal to the transmission and reception decoders in response to detection of either voice in the transmission speech samples or silence in the reception speech samples. In response to the skip signal, the transmission and reception decoders discard a current transmission packet and a current reception packet and read a next transmission packet and a next reception packet from the memory.

A further embodiment includes a method for recording and playback of a conversation using the wireless radio apparatus including the steps of:

storing far-end packets and near-end packets in a memory;

decoding the far-end packets to form far-end speech samples and the near-end packets to form near-end speech samples; and mixing the far-end speech samples with the near-end speech samples to form mixed speech signals for playback on a speaker.

Additional steps include:

generating a skip signal in response to detecting voice in the transmission speech samples or silence in the reception speech samples;

discarding a current transmission packet and a current reception packet in response to the skip signal; and reading a next transmission packet and a next reception packet from the memory in response to the skip signal.

BRIEF DESCRIPTION OF THE DRAWINGS

Further features and advantages of the present invention will become more readily apparent from a consideration of the following detailed description set forth with reference to the accompanying drawings, which specify and show preferred embodiments of the invention, wherein like elements are designated by identical references throughout the drawings; and in which.

DETAILED DESCRIPTION OF THE INVENTION

Figure 4:
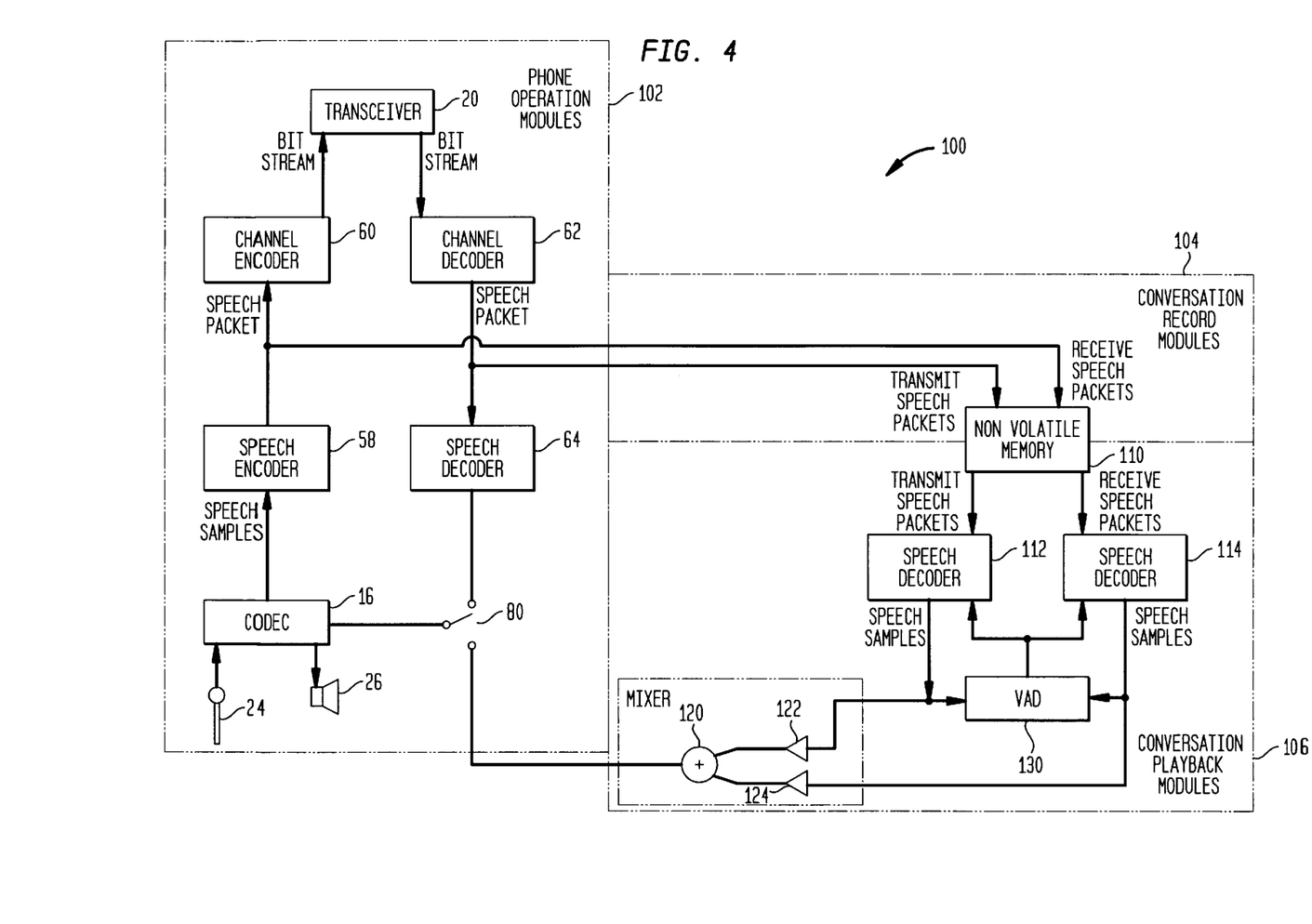
FIG. 4 shows a wireless digital telephone with a record and playback feature according to the present invention.

FIG. 4 shows a communication apparatus 100, such as a wireless digital telephone or a base station, with record and playback feature of the present invention. The apparatus 100 includes a cellular phone operation module 102, a conversation record module 104 and a conversation playback module 106. In the case of the base station implementation of apparatus 100, a service provider would provide the recording and playback feature in response to activation of a key on a telephone keypad, for example. In the case of the wireless telephone implementation of the apparatus 100, the playback and record feature is provided therein. For the wireless telephone, the operation module 102 is preferably similar to the operation module 52 of the conventional telephone 50 shown in FIG. 2. The detailed description of the operation module elements is provided above in connection with FIG. 2.

In particular, the microphone 24 and speaker 26 are connected to the codec 16, which converts signals between analog and digital formats. The codec 16 outputs digital speech samples to the transmission speech encoder 58 for encoding into transmission speech packets which are provided to the transmission channel encoder 60 for encoding into a transmission bit stream.

The transceiver 20 modulates the transmission bit stream for transmission to a far-end telephone, for example, and demodulates signals received from the far-end phone to form the reception bit stream which is decoded by the reception channel decoder 62 into reception speech packets for decoding by the reception speech decoder 64 into reception speech samples. During a normal telephone call, the reception speech samples are provided to the codec 16 through the switch 80.

Illustratively, the digital wireless phone processes speech in "frames" of 20 msec, which is a typical frame size in many existing standards. Typically, all the elements shown in FIG. 4, except for the transceiver 20, nonvolatile memory 110, microphone 24, loudspeaker 26, and codec 16 are included in a digital signal processor, DSP. The DSP may be part of a chip set which includes the memory 110. In normal conversation, during each frame, the DSP receives a far-end speech packet (which it decodes and sends to the audio output) and generates a near-end speech packet (from the audio input signal) which is then transmitted to the far-end.

In accordance with the present invention, during each frame, both far-end and near-end packets are written into the recording memory 110. Since both packets are available as a by product of normal operation, the recording does not require any significant DSP resources over the needs of normal communication.

In playback of a recorded conversation, during each frame, both near-end and far-end packets are read from the memory 110 and decoded by respective decoders 112 and 114. The outputs of the decoders 112 and 114 are frames of near-end speech and frames of far-end speech, respectively. Corresponding near-end and far-end speech frames are mixed. For example, a current near-end speech frame and a current far-end frame are mixed by a mixer 120, and the mixed signal directed to the audio output for playback on the speaker 26.

In summary, the operation module 102 transmits near-end signals generated by a user speaking into the microphone 24, and receives far-end signals from a far-end telephone to be heard by the user of the telephone 100 from its speaker 26. The record module 104 writes transmission packets formed from the near-end signals, e.g., in a first location of a memory 110, and reception packets formed from the far-end signals, e.g., in a second location of the memory 110. The playback module 106 reads the transmission packets and the reception packets from their respective locations in the memory 110, converts the transmission packets to transmission speech samples and the reception packets to reception speech samples, and mixes the transmission speech samples with the reception speech samples to form mixed speech signals for playback on the speaker 26.

Thus, unlike the conventional telephone 50 of FIG. 2, where far-end and near-end speech samples to and from the codec 16 are provided to the conventional conversation record module 54, the inventive telephone implementation of apparatus 100 provides near-end and far-end speech packets to the conversation record module 104. In particular, the near-end (transmission) and far-end (reception) speech packets from the speech encoder 58 and the channel decoder 62, respectively, are written or stored in the memory 110 shared by the record and playback modules 104 and 106. Illustratively, the memory 110 may be suitably implemented as a nonvolatile memory, such as a flash dynamic random access memory (DRAM).

Figure 5:
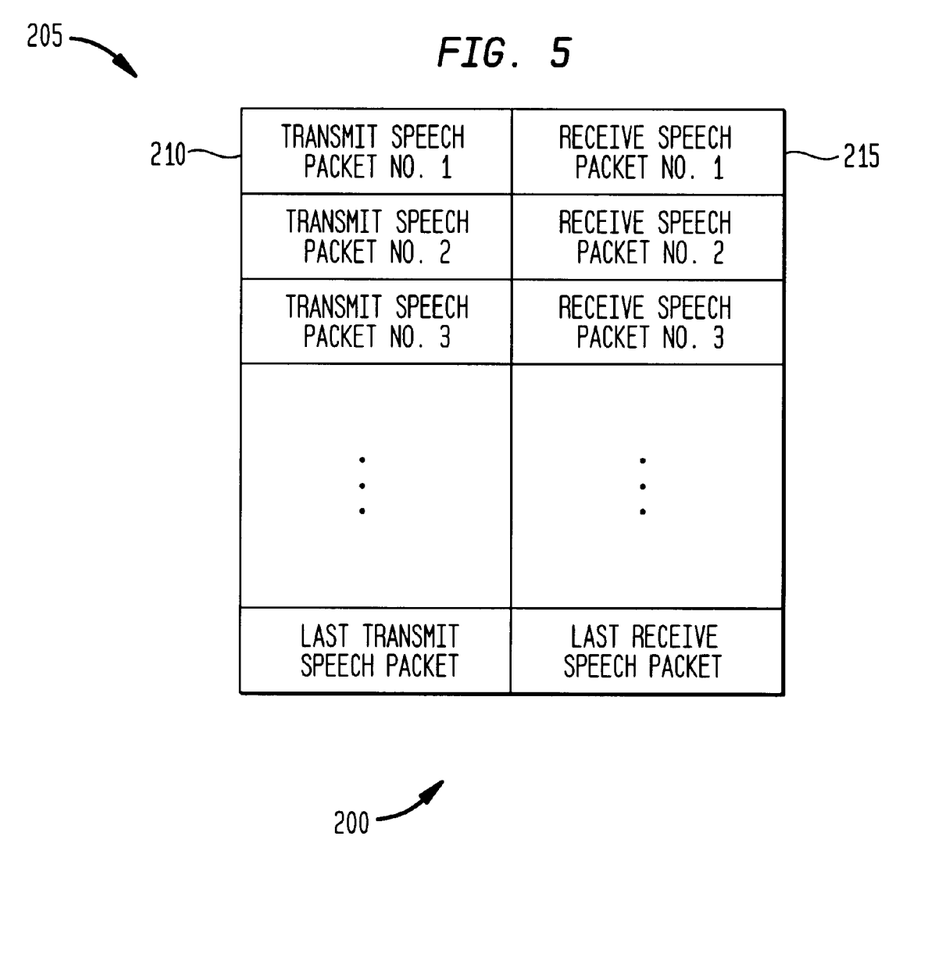
FIG. 5 illustrates individual far-end and near-end speech packets stored in a memory of the wireless digital telephone shown in FIG. 4 for mixing after being retrieved from the memory for playback.

FIG. 5 shows contents 200 of the nonvolatile memory 110 (FIG. 4) where each frame (n) includes individually recorded transmission and reception speech packets. For example, the first frame 205 includes a first transmission speech packet 210 and a first reception speech packet 215. Thus, two packets are stored per frame, rather than one packet 92 as shown in FIG. 3. For a fixed bit rate coder, storing two packets per frame instead of one packet implies doubling the amount of memory needed per frame. However, the required size of the memory is reduced if the speech encoder generates variable length packets.

Using variable length packets, as in the TIA-IS95 standard for code division multiple access (CDMA) coders for example, reduces the size of the required memory since one of the two transmission and reception packets will always be much smaller than the other, namely, the packet corresponding to the listening party. Thus, the ratio of the recording memory 200 (FIG. 5) required for the inventive telephone, in comparison to the memory 90 (FIG. 3) required for the conventional telephone, is about 1.25:1, which is much smaller than 2:1.

Similarly, using time division multiple access (TDMA) modulation, less than double the memory is needed for the inventive telephone in comparison to the memory required for the conventional telephone, if discontinuous transmission is used. In this case, the increase in the required memory size is about 1.5:1.

It is noteworthy that during the telephone conversation, no additional computational work is performed which would thereby require a larger amount of DSP resources. Rather, the only additional work is storing the near-end and far-end speech packets in the memory 110. Thus, a more powerful DSP is not required to provide the record and playback feature of the inventive wireless digital telephone.

In the inventive wireless digital telephone 100, mixing of the near-end and far-end speech packets, which requires a substantial portion of the typical DSP's resources, is performed during playback and thus occurs off-line, instead of during the call as performed in conventional telephones or TADs. Further, the inventive telephone apparatus 100 does not require having and running an additional encoder. Thus, the speech encoder 76 of the conventional telephone 50 shown in FIG. 2 is not required. Instead of having and running an additional encoder 76 and decoder 78 as shown in FIG. 2, the inventive telephone employs and runs two additional speech decoders 112 and 114. This approach further reduces the need for a more powerful DSP, since running a speech decoder is significantly less computationally intensive than running an encoder.

During playback, the separately stored near-end (transmission) and far-end (reception) speech packets are retrieved or read from the memory 110 and decoded by the two additional speech decoders 112 and 114, respectively, to form near-end (transmission) and far-end (reception) speech samples. The mixer 120 in the playback module 106 mixes the transmission and reception speech samples to form the mixed speech signals.

In one embodiment, the transmission and reception speech samples are amplified by amplifiers 122 and 124, respectively, prior to being mixed by the mixer 120, which may be embodied as an adder, for example. Preferably, both of the amplifiers 122 and 124 have a variable gain to allow the user to individually adjust the volume of the near-end (transmission) and far-end (reception) speech signals which are heard from the speaker 26 during playback of the recorded speech.

It is noteworthy that individually adjusting the volume of transmission and reception signals while listening to the recorded conversation is simply not possible with the conventional telephone 50 shown in FIG. 2, even if the two amplifiers 72 and 74 are variable. One reason is due to the two signals being stored in an already mixed state. Another reason is because varying the gain of the amplifiers 72 and 74 during recording does not change the level of the sound heard by the user during the conversation as only the level of the packets stored in the memory 76 is changed. Thus, the user cannot immediately hear the effect of the gain adjustment of the conventional telephone and has no feedback that allows meaningful adjustment of the amplifier gains. During playback, varying the gain of the amplifiers 72 and 74 does not change the volume of the conversation heard by the user since the amplifiers 72 and 74 are not active during playback.

In the playback mode, the mixed transmission and reception speech samples from the mixer 120 are provided to the codec 16 through a switch 80 similar to that described in connection with FIG. 2.

In a further embodiment, the playback module 106 includes a voice activity detector 130 which outputs a skip signal to the transmission and reception decoders 112 and 114 in response to detection of either voice in the transmission speech samples or silence in the reception speech samples. Alternatively, the skip signal may be generated due to other conditions such as no speech activity in both directions (both reception and transmission are silent), or no speech in the reception direction only (reception is silent). Thus, the skip signal may be generated in response to detection of either no voice in the reception speech samples or no voice in the reception and transmission speech samples.

Illustratively, the voice activity detector 130 is connected to receive the transmission and reception speech samples from the transmission and reception decoders 112 and 114, and has an output connected back to the transmission and reception decoders 112 and 114.

Alternatively, two voice activity detectors are used. One receives the transmission speech samples from the transmission decoder 112, and another receives the reception speech samples from the reception decoder 114. In this case, the outputs of the two voice activity detectors are connected to the transmission and reception decoders 112 and 114 to provide thereto the skip signal.

When the voice activity detector 130 or the two voice activity detectors generate the skip signal, the reception speech samples and transmission speech samples of the current frame (n) are discarded. The two speech decoders 112 and 114 read their corresponding next packets of the next frame (n+1) from the nonvolatile memory 110, decode them and output the resulting speech samples to replace the samples of the current frame (n) which have been discarded. Voice activity is now tested on the new speech samples and the same procedure is repeated until a speech frame is found with either speech activity on either the reception or transmission side, or speech activity in the reception side. This allows skipping over unwanted speech, such as skipping over the transmission or near-end speeches (i.e., the telephone user's own speech) and only playing back the reception speeches.

A further embodiment includes a method for recording and playback of a conversation using a wireless radio apparatus or any communication equipment having coders and encoders. The method includes transmitting near-end-signals and receiving far-end signals; writing transmission packets formed from the near-end signals, e.g., in a first location, of a memory and reception packets formed from the far-end signals, e.g., in a second location of the memory; reading the transmission packets and the reception packets from the memory; decoding the transmission packets to form transmission speech samples and the reception packets to form reception speech samples; and mixing the transmission speech samples with the reception speech samples to form mixed speech signals for playback on a speaker.

Further steps include generating a skip signal in response to detecting voice in the transmission speech samples or silence in the reception speech samples; discarding a current transmission packet (n) and a current reception packet (n) in response to the skip signal; and reading a next transmission packet (n+1) and a next reception packet (n+1) from the memory in response to the skip signal.

The inventive telephone may be implemented to simultaneously comply with different telecommunication standards and modulation schemes, such as time division multiple access (TDMA) and code division multiple access (CDMA) standards, and the global system for mobile communications (GSM) standard.

Each wireless communication standard (e.g. TDMA, CDMA, GSM) supports several speech coders, and the speech coder in use may change from conversation to conversation, or even during the conversation. To distinguish between the different types of encoding and decoding, at the beginning of the recording, the DSP writes to the recording memory 110 a "header" indicating the type of speech coder in use. Each time a speech coder is switched, a similar header is written to the recording memory 110.

It should be noted that instead of two speech decoders 112 and 114 in the playback module 106, one speech decoder may be shared by the near-end and far-end speech packets. In this case, during playback, the speech decoder is executed twice, once on the near-end packet where the near-end speech decoder is executed, and once on the far-end packet. Since the speech decoder is a recursive device which relies on state variables, the state variables corresponding to the far-end packet stream and to the near-end packet stream are kept separately. This separation insures that, at each call to the speech decoder, the correct state variables are used.

The inventive wireless telephone and method, where mixing is performed during playback, instead of during recording, provide recording of a two way conversation without the need for increased DSP resources during the call or conversation, since computations are deferred and performed off-line in the playback mode, rather then in the record mode during the call or on-line.

The DSP resources are further conserved due to using a decoder instead of an encoder, which also eliminates quality degradation of the played-back speech due to tandeming of the far-end signal. Further, the inventive wireless telephone allows individual volume control of the near-end and far-end speech signals actually heard by the user in the playback mode.

In addition, the total additional DSP resources used for both the record and playback modes are lower than required in the method used in TADs and conventional wireless telephone with a record and playback feature. The additional computation required in the TAD method used in conventional wireless telephone includes the execution of a speech encoder and a speech decoder, while the additional computation required in the inventive wireless telephone includes the execution of two speech decoders. Typically the execution of a speech encoder requires five to ten times the resources required by a speech decoder. Thus the inventive wireless telephone and record and playback method reduce not only peak DSP load, but also overall computational DSP load thus reducing power consumption.

While the invention has been particularly shown and described with respect to illustrative and preferred embodiments thereof, it will be understood by those skilled in the art that the foregoing and other changes in form and details may be made therein without departing from the spirit and scope of the invention which should be limited only by the scope of the appended claims.

What is claimed is:

1. A communication apparatus comprising:
   an operation module which transmits near-end signals and receives far-end signals;
   a record module which writes transmission packets formed from said near-end signals in a first location of a memory and reception packets formed from said far-end signals in a second location of said memory; and
   a playback module which reads said transmission packets and said reception packets from said memory, converts said transmission packets to transmission speech samples and said reception packets to reception speech samples, and mixes said transmission speech samples with said reception speech samples to form mixed speech signals for playback on a speaker.

2. The communication apparatus of claim 1, wherein said playback module includes a voice activity detector which outputs a skip signal in response to a detection of either no voice in said reception speech samples or no voice in said reception speech samples and in said transmission speech samples, said playback module discarding a current transmission packet and a current reception packet and reading a next transmission packet and a next reception packet from said memory in response to said skip signal.

3. The communication apparatus of claim 1, wherein said playback module includes a mixer which mixes said transmission speech samples with said reception speech samples to form said mixed speech signals.

4. The communication apparatus of claim 1, wherein the communication apparatus is a wireless radio apparatus.

5. The communication apparatus of claim 1, wherein the communication apparatus is a base station.

6. A method for recording and playback of a conversation using a wireless radio apparatus comprising the steps of:
   transmitting near-end signals;
   receiving far-end signals;
   writing transmission packets formed from said near-end signals in a first location of a memory and reception packets formed from said far-end signals in a second location of said memory;
   reading said transmission packets and said reception packets from said memory;
   decoding said transmission packets to form transmission speech samples and said reception packets to form reception speech samples; and
   mixing said transmission speech samples with said reception speech samples to form mixed speech signals for playback on a speaker.

7. The method of claim 6, further comprising the steps of:
   generating a skip signal in response to detecting voice in said transmission speech samples or silence in said reception speech samples;

discarding a current transmission packet and a current reception packet in response to said skip signal; and reading a next transmission packet and a next reception packet from said memory in response to said skip signal.

8. A method for recording and playback of a conversation using a wireless radio apparatus comprising the steps of:

storing far-end packets and near-end packets in a memory;

decoding said far-end packets to form far-end speech samples and said near-end packets to form near-end speech samples; and mixing said far-end speech samples with said near-end speech samples to form mixed speech signals for playback on a speaker.

9. The method of claim 8 further comprising, prior to the decoding step, retrieving said far-end packets and said near-end packets from said memory.

10. The method of claim 8 wherein the decoding step decodes said far-end packets and said near-end packets stored in said memory.

11. A wireless radio apparatus for recording and playback of a conversation comprising:

a memory for storing far-end packets and near-end packets;

a decoder for retrieving and decoding said far-end packets to form far-end speech samples and said near-end packets to form near-end speech samples; and a mixer for mixing said far-end speech samples with said near-end speech samples to form mixed speech signals for playback on a playback means.

12. The wireless radio apparatus of claim 11, further comprising voice activity detection means for generating a skip signal in response to detecting voice in said near-end speech samples or silence in said far-end speech samples wherein, in response to said skip signal, a current transmission packet and a current reception packet are discarded and a next transmission packet and a next reception packet are retrieved from said memory.

13. A chip set including a digital signal processor and a memory, said digital signal processor comprising:

an encoder which encodes transmission speech samples to form transmission speech packets for storage in a first location of said memory;

a channel decoder which decodes reception speech samples to form reception speech packets for storage in a second location of said memory;

a decoder which decodes said reception speech packets to form far-end speech samples and said transmission speech packets to form near-end speech samples; and a mixer which mixes said far-end speech samples with said near-end speech samples to form mixed speech signals for playback.

14. The chip set of claim 13, further comprising a voice activity detector which generates a skip signal in response to detecting voice in said near-end speech samples or silence in said far-end speech samples wherein, in response to said skip signal, a current transmission packet and a current reception packet are discarded and a next transmission packet and a next reception packet are retrieved from said memory.

15. A communication apparatus comprising:

an operation module which transmits near-end signals and receives far-end signals;

a record module which writes transmission packets formed from said near-end signals in a first location of a memory and reception packets formed from said far-end signals in a second location of said memory; and a playback module which reads said transmission packets and said reception packets from said memory, the playback module including a first decoder which converts said transmission packets to transmission speech samples and a second decoder which converts said reception packets to reception speech samples, the playback module being operative to mix said transmission speech samples with said reception speech samples to form mixed speech signals for playback on a speaker.

16. The communication apparatus of claim 15, wherein said playback module includes a voice activity detector which outputs a skip signal to said transmission decoder and said reception decoder in response to a detection of voice in said transmission speech samples or silence in said reception speech samples, said transmission decoder and said reception decoder discarding a current transmission packet and a current reception packet and reading a next transmission packet and a next reception packet from said memory in response to said skip signal.

17. A communication apparatus comprising:

an operation module which transmits near-end signals and receives far-end signals;

a record module which writes transmission packets formed from said near-end signals in a first location of a memory and reception packets formed from said far-end signals in a second location of said memory; and a playback module which reads said transmission packets and said reception packets from said memory, converts said transmission packets to transmission speech samples and said reception packets to reception speech samples, and mixes said transmission speech samples with said reception speech samples to form mixed speech signals for playback on a speaker, said playback module including a voice activity detector which outputs a skip signal in response to a detection of voice in said transmission speech samples or silence in said reception speech samples, said playback module discarding a current transmission packet and a current reception packet and reading a next transmission packet and a next reception packet from said memory in response to said skip signal.

18. A communication apparatus comprising:

an operation module which transmits near-end signals and receives far-end signals;

a record module which writes transmission packets formed from said near-end signals in a first location of a memory and reception packets formed from said far-end signals in a second location of said memory; and a playback module which reads said transmission packets and said reception packets from said memory, converts said transmission packets to transmission speech samples and said reception packets to reception speech samples, and mixer said transmission speech samples with said reception speech samples to form mixed speech signals for playback on a speaker, said playback module including a first amplifier which amplifies said transmission speech samples and a second amplifier which amplifies said reception speech samples prior to mixing thereof.

19. The communication apparatus of claim 18, wherein at least one of said first amplifier and said second amplifier has a variable gain.

* * * * *